May 5, 1936. J. E. SHAFER 2,039,351
CAR WHEEL JOURNAL BEARING
Filed July 13, 1931
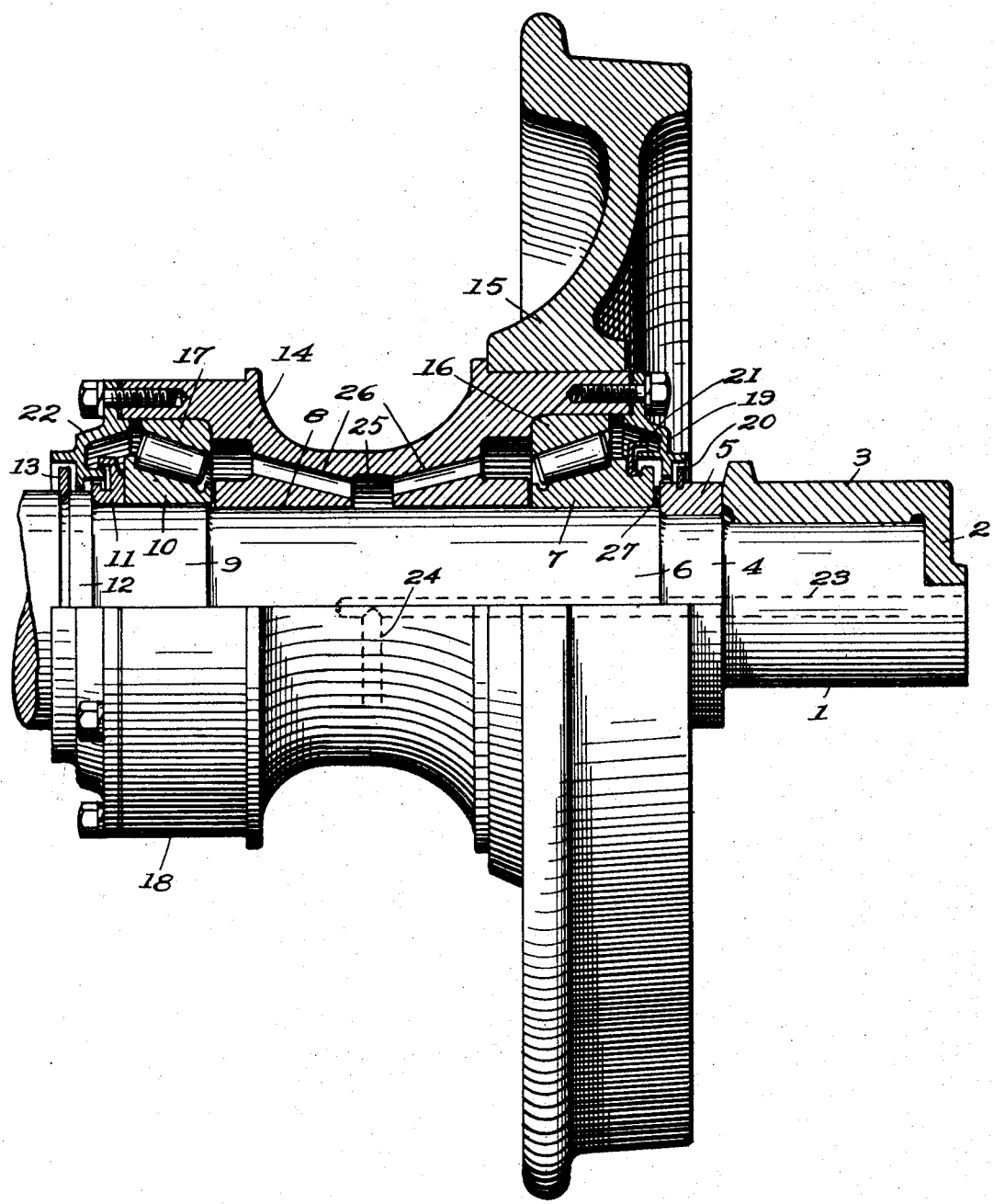
Inventor.
Julius E. Shafer
Atty.

Patented May 5, 1936

2,039,351

UNITED STATES PATENT OFFICE 2,039,351

CAR WHEEL JOURNAL BEARING

Julius E. Shafer, Chicago, Ill.

Application July 13, 1931, Serial No. 550,417

8 Claims. (Cl. 295—36)

My invention relates more particularly to the provision of journal bearings for railway cars though it is of course not limited to this particular use but is capable of advantageous use for a variety of other purposes, as will be apparent to those skilled in the art to which my invention appertains.

Heretofore the ordinary railway car wheels have been pressed upon the opposite ends of the car axle, and the axle mounted to rotate in its journals, with the result that in turning curves, one or both of the car wheels on a given axle are forced to slide, thereby increasing the amount of power required to move the train, and so it is one object of my invention to provide a structure in which the axle itself does not rotate but the wheels rotate individually upon it thereby accomplishing what may be termed free-wheeling.

I am aware that efforts have been made to mount railway car wheels on their axle with anti-friction bearings but in these structures, to provide a factor of safety in case of failure of the anti-friction bearing, the axle itself has been mounted so that it could turn after the fashion of the ordinary axle in case of the anti-friction bearing failed and locked, and so it is another object of my invention to provide a structure in which the wheel is provided with a radial load and thrust bearing whereby sufficient anti-friction bearing capacity is provided, and in addition, I also provide a plain bearing between the wheel and the axle whereby in case of wear or excessive looseness of the anti-friction bearings, the plain bearing will come into service and permit the car to proceed at least to a convenient point for taking it out of the train, if not to its ultimate destination.

It should be understood that in the case of failure of the radial and/or thrust bearing assembly the plain bearing comes into action and the ends of the plain bearing abut against the radial and thrust bearing members to hold the wheel in alinement. The roller or ball bearing race members of the thrust and radial bearings prevent longitudinal movement of the wheel relative to the axle. This, of course, maintains the tread of the wheel upon the track.

Other objects of my invention will appear and be described in the specification, and together with the novelty of my invention, will be specifically pointed out in the claims.

The accompanying drawing is a partly sectional view of a structure embodying my invention.

For purposes of illustration and to show one form of construction embodying my invention, though without limiting myself to the details and arrangement of parts shown and to be herein described, but availing myself of all changes and modifications which may be made within the scope of the appended claims, I have shown a structure in which 1 represents the axle which may have its end cut away to be engaged by the flange 2 of the saddle 3, the latter fitting in the same place that the ordinary bronze bearing fits in the ordinary box of a railway car. It is to be noted that the axle 1 is increased in diameter in steps toward the center; the first step 4 carrying the thrust ring 5; the second step 6 carrying the cone 7 of the radial anti-friction bearing, and also, under certain conditions to be described later, affording a bearing surface for the plain bearing 8; the third step 9 carries the cone 10 of the thrust bearing and also the packing ring 11; while the fourth step 12 is the beginning of the central portion of the axle and carries the ring 13 adjacent the packing ring 11.

A wheel hub or carrier 14 is provided and a wheel 15 is pressed or otherwise suitably mounted thereon, and this hub 14 is chambered at each end to receive the cup 16 of the radial load bearing, and the cup 17 of the thrust load bearing, a portion 18 being formed to receive a drive pulley for an electric generator in those cases where the car is so equipped. That portion of the hub 14 which lies between the cups 16 and 17 is formed into the plain bearing 8 which is finished to a diameter slightly in excess of the diameter of the step 6 so that during such time as the anti-friction bearings are functioning properly, the plain bearing 8 is just clear of the step 6, the amount of this clearance being determined by the amount of wear of the anti-friction bearing allowed for before the plain bearing 8 comes into service.

A labyrinth packing is formed at the wheel end of the hub 14, by the ring 19 suitably secured to the end of the hub 14 and co-operating with ring 20 carried by the thrust ring 5, and ring 21 carried by the cone of the bearing 7, together with the formation of the adjacent parts, and a similar packing is formed at the thrust end of hub 14 by the ring 22 which co-operates with the ring 13 carried by the step 12 and the ring 11 carried by the step 9 of the axle.

To provide for the introduction of lubricant, a duct 23 is formed in the axle and in communication with a duct 24 the latter opening into the annular space 25 formed in the plain bearing 8, lateral ducts 26 being formed from the space 25 to the bearing at each end of the hub 14.

Assume the parts to be in the position shown in the drawing and that it is desired to dis-assemble the structure. In common with all other railway wheels and axles it is of course first necessary to remove the wheels and the axle from under the car, after which the saddle 3 is removed and by removing the screws which hold the ring 22 on the thrust end of the hub 14, and by pressing the axle 1 endwise toward the left with relation to the wheel, the thrust ring 5 is pressed off of its step 4, leaving the cone 10 on its step 9 but removing all of the other parts, after which by removing the ring 19 from the wheel end of the hub, the cone 7 may be removed as well as the cup 16, or the cup 17 for renewal if desired. If it is desired to remove the cone 10 this will also be accessible at this time.

To re-assemble the parts, or to make the first assembly, the cups 16 and 17 are seated in the hub 14, the cone 10 and its associated rollers pressed upon the step 9 after the rings 11, 13 and 22 have been placed, the hub 14 being now placed upon the axle and the cone 7 and its associated rollers then brought to the proper position with relation to the cup 16 and the bearings properly adjusted. At this point it is necessary to establish the permanent adjustment of the bearings and this is done by means of shims 27 placed between the left end of the cone 7 and the face of the thrust washer 5. It is advisable to provide a duplicate of the ring 5, though slightly larger in bore so that it may be readily slipped over the step 4 and with this duplicate ring and a feeler gauge, proper amount of shim may be determined, whereupon when this shim has been placed, the thrust ring 5 may be pressed home on its step 4 thus permanently adjusting the bearings on the axle.

After this has been accomplished the ring 19 may be again secured in place and the ring 20 snapped over the thrust ring 5, and the ring 22 secured at the opposite end of the hub whereupon the axle and its wheels will be ready for mounting under the car.

It will be seen from the above that I have provided a structure in which each car wheel may turn independently of the other thereby greatly reducing the tractive effort required on curves; a structure which, should any undue wear occur in the anti-friction bearings, is provided with a plain bearing which automatically comes into service to permit the car to complete its journey or be delivered to a convenient point for repair; a structure which provides ample facilities for lubrication; and a structure which is inexpensive to build, easy to assemble and dis-assemble and is efficient in action.

In those cases where it is desired to make no change whatever in the style and arrangement of the outer ends of the axle, it is obvious that it may be formed after the manner of the ordinary axle to fit into the ordinary boxes used in the ordinary railway car side frames.

Having thus fully described my invention I claim:

1. In a car wheel journal bearing the combination of an axle, a wheel hub rotatably mounted thereon, anti-friction bearings between the wheel hub and the axle, a plain bearing between the wheel hub and the axle and adapted to come into operation under abnormal conditions, and lubricant passages communicating between the anti-friction bearings and the plain bearings and providing a free circulation of lubricant throughout the structure.

2. In a car wheel journal bearing the combination of a non-rotatable axle, a pair of independently rotatable wheels associated therewith, a pair of combined radial and thrust antifriction bearings for each wheel, a plain bearing for each wheel and between the antifriction bearings therefor, one race of each antifriction bearing forming a thrust bearing for the plain bearing when the latter is in service.

3. In a railway replacement axle and wheels unit the combination of a non-rotatable axle to replace the former rotatable axle, a pair of wheels independently rotatably mounted on the axle, a pair of radial and thrust antifriction bearings for each wheel and spaced apart on the axle, a plain bearing between the pair of antifriction bearings for each wheel, and plain end thrust bearings for each wheel, all the plain bearings coming into action upon the development of looseness in the antifriction bearings.

4. In a car wheel journal bearing the combination of an axle, a pair of independently rotatable wheels associated therewith, a pair of combined radial and thrust anti-friction bearings for each wheel, a plain radial bearing for each wheel and between the anti-friction bearings therefor, and a plain thrust bearing for each wheel to maintain wheel alignment and spacing upon looseness in the anti-friction bearing.

5. In a railway replacement axle and wheels unit the combination of an axle, a pair of wheels independently rotatably mounted on the axle, a pair of radial and thrust anti-friction bearings for each wheel and spaced apart on the axle, a plain radial bearing between the pair of anti-friction bearings for each wheel, and plain end thrust bearings for each wheel, all the plain bearings coming into action upon the development of looseness in the anti-friction bearings.

6. In a railway wheel carrier the combination of a housing of a length not exceeding half the distance between the outer rims of railway wheels, a wheel receiving portion carried thereby, a pair of anti-friction bearing seats formed therein, and a plain thrust and radial bearing portion carried thereby.

7. In a railway wheel carrier the combination of a housing not exceeding in length half the distance between the outer rims of railway wheels, a wheel receiving portion carried thereby, a pair of anti-friction bearing seats formed therein one adjacent each end of said housing, and a plain thrust and radial bearing carried thereby and between the anti-friction bearing seats.

8. Bearing structure comprising, in combination with an axle and a wheel associated therewith, a pair of anti-friction bearings for mounting the wheel upon the axle, a plain bearing carried by the wheel between the anti-friction bearings and normally out of contact with the axle, said plain bearing adapted to come into contact with the axle under abnormal conditions to carry the load and abut said anti-friction bearings to prevent longitudinal movement of the wheel relative to the axle.

JULIUS E. SHAFER.